United States Patent [19]

Refi et al.

[11] Patent Number: 4,912,523
[45] Date of Patent: Mar. 27, 1990

[54] OPTICAL FIBER COMMUNICATION SYSTEM COMPRISING MODE-STRIPPING MEANS

[75] Inventors: James J. Refi, Atlanta; Ian A. White, Roswell, both of Ga.

[73] Assignee: AT&T Bell Laboratories, Murray Hill, N.J.

[21] Appl. No.: 37,292

[22] Filed: Apr. 10, 1987

[51] Int. Cl.[4] ............................................... H04B 9/00
[52] U.S. Cl. .................................... 455/607; 455/600; 455/612; 370/1; 350/354
[58] Field of Search ...................... 350/96.19, 360, 353, 350/354; 455/617, 612, 610, 607, 606, 600, 620; 370/1, 3

[56] References Cited

U.S. PATENT DOCUMENTS

| | | | |
|---|---|---|---|
| 3,891,302 | 6/1975 | Dabby et al. | 350/96 |
| 3,931,518 | 1/1976 | Miller | 250/227 |
| 3,982,123 | 9/1976 | Goell et al. | 250/227 |
| 4,253,727 | 3/1981 | Jeunhomme et al. | 350/96.15 |
| 4,749,248 | 6/1988 | Aberson et al. | 350/96.19 |

OTHER PUBLICATIONS

*Electronics Letters,* vol. 23, No. 2, 16 Jan. 1987, "Signal Transmission With Optical Carriers in Multimode Range of Single-Mode Fibres" by R. Ries, pp. 71-72.
*Applied Optics,* vol. 10, No. 10, Oct. 1971, "Weakly Guiding Fibers" by D. Gloge, pp. 2252-2258.
*Optical Waveguide Theory,* A. W. Snyder et al., (1983) pp. 487-541; Chapman and Hall; New York.
Abstracts of papers at *OFC/IOOC* 1987, Reno, Nevada, Paper MD2 (3 pages); Stern et al.; Jan. 19-22, 1987.

*Primary Examiner*—Robert L. Griffin
*Assistant Examiner*—L. Van Beek
*Attorney, Agent, or Firm*—Eugen E. Pacher

[57] ABSTRACT

In an optical fiber communication system that operates at a wavelength $\lambda_o$ and comprises optical fiber having a cut-off wavelength $\lambda_c > \lambda_o$, a "grating", with parameters chosen such that the grating causes resonant coupling between a predetermined guided mode (e.g., $LP_{11}$) and a tunneling-leaky mode, can be advantageously used to remove unwanted guided modes. Such removal can substantially improve the bandwidth of such a system.

5 Claims, 2 Drawing Sheets

OPTICAL FIBER COMMUNICATION SYSTEM COMPRISING MODE-STRIPPING MEANS

FIELD OF THE INVENTION

This invention pertains to communication systems using optical fiber as the transmission medium.

BACKGROUND OF THE INVENTION

Optical fiber has found widespread application as a long haul transmission medium for voice and data transmission. For instance, substantially all of the newly installed capacity in the trunk portion of the public switched telephone network in the U.S. is optical fiber-based.

Although optical fiber at present is not widely used in the feeder and distribution portion of multi-user networks, e.g., the telephone network, extension of the use of optical fibers into this portion of networks is desirable and is expected to occur within the near future, resulting ultimately in all-optical communication systems.

Since typically the equipment and labor costs for connecting a subscriber, or a group of subscribers, to a central office or other switching station is a major portion of the total cost of a communication system, the ability to provide such connection by optical means at relatively low cost is of utmost significance, if an optical distribution network is to become commercially feasible. Such a distribution network would be highly desirable since, inter alia, it would be immune to electromagnetic interference and be relatively secure. Since optical fiber can have very large bandwidth, such a network also could in principle, provide to subscribers very wideband communication channels.

The fiber of choice for long-haul applications is currently silica-based single mode fiber, with the operating wavelength typically being about 1.3 $\mu$m. Because silica-based fiber generally has lowest loss at about 1.55 $\mu$m, it is expected that future long-haul fiber systems will be operating at that wavelength. Necessary components such as radiation sources (lasers) and detectors for use at 1.3 $\mu$m are commercially available but are still relatively expensive, whereas the components for use at 1.55 $\mu$m are still under development. On the other hand, components for use at shorter wavelengths, e.g., about 0.85 $\mu$m, are readily available and quite inexpensive.

Due to the still high cost of sources and detectors for 1.3 $\mu$m radiation, it appears that an optical fiber distribution system that operates at 1.3 $\mu$m would at present not be economically viable. On the other hand, it would be highly desirable to use in distribution systems optical fiber that is single mode at 1.3 $\mu$m and/or 1.55 $\mu$m, since this would permit upgrading, without replacement of the optical fiber, to one or both of these wavelengths at a later time when improvements in component costs make this economically feasible. Such upgrading would be desirable, inter alia, because of the resultant decrease in loss, and because both long-haul and distribution portions of the network would then operate at the same wavelength, resulting in decreased complexity and in economies of scale.

Several authors have considered the implications of the use of optical fiber that is single mode at 1.3 $\mu$m and/or 1.55 $\mu$m (i.e., that has a cut-off wavelength $\lambda_c$ less than about 1.3 $\mu$m) in a communication system that operates at a wavelength $\lambda_o$ less than $\lambda_c$ (e.g., at about 0.85 $\mu$m). See, for instance, R. Ries, *Electronics Letters*, Vol. 23 (2), pp. 71–72 (1987). The general conclusion is that the presence of higher order modes results in a very significant decrease of the attainable bandwidth of such a system (to be referred to herein as a "hybrid" system) due to differential mode delay. M. Stern et al, Abstracts of papers at *OFC/IOOC* 1987, Reno, Nev., Paper MD 2, teach that the bandwidth of a hybrid system can be increased if a section of a second fiber that has a cut-off wavelength $\lambda_c' < \lambda_o$ is inserted into the transmission path ahead of the radiation detector. Since only the fundamental mode can propagate substantially without loss in the second fiber, the second fiber acts as a mode filter that removes the higher order modes from the transmission path.

Although the insertion of a length of an appropriate second fiber does improve the attainable bandwidth of a hybrid system, the approach does have several shortcomings. For instance, it lacks selectively in that it results in simultaneous removal of all higher order modes. However, for at least some applications it would be desirable to be able to selectively tap any predetermined mode (including the fundamental mode $LP_{01}$) from a fiber, without substantially attenuating the other modes. Use of one or more second filters also makes later upgrading to operation at 1.3 $\mu$m or 1.55 $\mu$m more difficult, since it requires removal of the second fibers and, typically, some reconfiguration of the network. Furthermore, use of second fiber mode filters results in considerable loss of signal power, since not only all the power in the higher order modes is stripped from the fiber, but also a significant amount (typically about 1.5–2 db) of $LP_{01}$ power is lost at each transition from the first to the second fiber, due to the unavoidable mode field radius mismatch between the first and second fibers. Furthermore, modal noise generated at splices and connections potentially has a deleterious effect on systems operations, especially if single frequency laser sources are used.

In view of the potential significance of an inexpensive "hybrid" optical fiber communication system that has relatively wide bandwidth and can easily be upgraded to single mode operation at longer wavelengths, a hybrid system that uses a mode stripping technique that is not subject to the above discussed shortcomings of the prior art is of considerable interest. This application discloses such a system.

A known approach to tapping radiation from an optical fiber comprises introducing a spatially periodic "grating" (e.g., a mechanical deformation) into the fiber, with the periodicity (and possibly other parameters of the grating) chosen to result in conversion of guided modes into higher order unguided modes. See, for instance, U.S. Pat. Nos. 3,931,518, and 4,253,727, incorporated herein by reference. Other relevant patents are U.S. Pat Nos. 3,891,302 and 3,982,123.

Although the grating technique has generally been considered to be applicable only to multimode fiber, it has recently been discovered that it can, through judicious choice of parameters, also be made to work efficiently with single mode fiber. See U.S. Pat. No. 4,749,248 incorporated herein by reference. Briefly, it is taught there that in the continuum (as a function of propagation constant $\beta$) of radiation modes of an optical fiber there can exist certain relatively narrow ranges of $\beta$ in which constructive interference between the modes occurs, making possible efficient (resonant) coupling between a given guided mode and a given one of these so-called "tunneling leaky" (TL) modes. For background on the leaky mode description of the radiation modes, see, for instance, A. W. Snyder et al, *Optical Waveguide Theory*, (1983), especially pp. 487–541.

Glossary of Terms

An "optical fiber" (or fiberguide, or other equivalent term) is an elongated body comprising an interior region (the core) having a higher refractive index (at the signal wavelength $\lambda_o$) than the region surrounding the core, the cladding. Optical fiber can comprise cladding having a multiplicity of regions differing from each other with respect to the refractive index, and typically is enveloped by a coating, or multiple coatings. The coating typically is a polymer and may be transparent to radiation of wavelength $\lambda_o$.

In optical communications systems frequently two or more lengths of fiber are spliced or otherwise joined together to form a continuous optical transmission path from a first fiber end to a second fiber end. One end often can be considered to be the input end and the other output end of the transmission path. However, it is possible to operate a system such that a given path carries signals in both directions, with sending and receiving means at each fiber end.

The radiation guided in an optical fiber, or radiated therefrom, can be described in terms of "modes" of radiation. Herein the nomenclature introduced by D. Gloge, *Applied Optics*, Vol. 10, pp. 2252–2258 (1971) is used to identify the modes. With each mode $LP_{ij}$ can be associated an attenuation constant $\alpha_{ij}$ and a propagation constant $\beta_{ij}$.

"Tunneling leaky" (TL) modes are the low order radiating modes that have relatively small attenuation constants and therefore have a relatively well defined propagation constant.

A "grating" herein is a fiber region in which the transmission characteristics of the fiber are varying in a periodic or pseudo-periodic fashion. A grating comprises N elements, with repeat length $\Lambda(z)$, where z is the longitudinal fiber coordinate. Associated with the grating is an "envelope amplitude" described by an "envelope" function g(z) that can be constant or vary as a function of z. The fiber characteristics vary in a "periodic" manner if $\Lambda(z)$ is a constant, and they vary in a "pseudo-periodic" manner if $\Lambda(z)$ is a regular and predetermined function of z. The "amplitude" of an element of a grating is the maximum fiber axis displacement, or the maximum refractive index change, associated with the element.

SUMMARY OF THE INVENTION

We have discovered that grating devices of the general type disclosed in the above referred to U.S. Pat. No. 4,749,248 can advantageously be used to significantly increase the bandwidth of a hybrid system by removal of any desired guided mode from the transmission path. This increase in bandwidth, as well as other advantages are obtained in systems according to the invention without incurring at least some of the shortcomings associated with the previously discussed mode filtering technique.

Broadly speaking, an optical fiber communication system according to the invention comprises a source of electromagnetic radiation of wavelength $\lambda_o$, an optical fiber transmissin channel, means for coupling radiation into the optical fiber at a first fiber location, and means for detecting the radiation at a second fiber location spaced from the first location. These locations typically are subscriber stations, a central office or remote terminal, terminals in a LAN, or the like. The optical fiber transmission channel consists substantially of optical fiber having $\lambda_c < \lambda_o$, such that, in addition to the fundamental ($LP_{01}$) mode, one or more higher order modes of the radiation are guided in the optical fiber. At one or more appropriate locations intermediate the first and second fiber locations (or possibly substantially at the second fiber location) a grating is caused to be present in the fiber, with the grating parameters (repeat length envelope shape, amplitude, number of periods, etc.) chosen such that resonant coupling between a predetermined guided mode and an appropriate TL mode results, with the radiation in the TL mode then being emitted from the fiber. If desired, the emitted radiation can be caused to be incident on a radiation detector and be detected. Alternatively, the radiation emitted from the grating coupler may be radiated away. In both cases, the system bandwidth is substantially increased, compared to the same system without mode filtering.

An exemplary embodiment of the invention is a communication system that has the capability for two-way communication between a first and a second station. Each of the two stations comprises radiation generating means (e.g., a 780 nm laser) and detection means. A single optical fiber connects the two stations, with a grating device positioned at or close to the one terminal, stripping the $LP_{11}$ mode from both the incoming and outgoing signals, and another grating device, poistioned at or close to the other terminal, similarly stripping the $LP_{01}$ mode from both signals. At both stations, the mode stripped from the respective incoming signal is detected, whereas the mode stripped from the respective outgoing signal typically is permitted to be lost. The exemplary system is able to support, without use of splitters or the like, simultaneous high bandwidth bidirectional information transfer.

The use of a grating to strip one or more guided modes from the transmission fiber in a hybrid communication system has significant advantages over the prior art. A grating can efficiently filter out any desired guided mode, without significant loss of power in the other modes, and does not introduce a substantial amount of modal noise into the system. A significant further advantage of the use of gratings in a bidirectional hybrid communication system is the attendant increased tolerance for reflection from splices and the like, as will be discussed in more detail below. A convenient (and currently preferred) way to produce a grating in an optical fiber is by impressing periodic (or quasiperiodic) microbends on the fiber. Devices of this type are frequently referred to as PMDs (periodic microbend devices).

PMDs have further advantageous features. They are easily installed or removed, are noninvasive, do typically not require stripping of the protective coating from the fiber, and permit fine tuning through control of the amplitude of the microbends. Gratings can also be produced by other means, e.g., by introducing an appropriate spatial refractive index variation into the fiber, e.g., by means of the photorefractive or the photoelastic effect.

BRIEF DESCRIPTION OF THE DRAWINGS

Analogous elements are identified by like numerals in different Figures.

DETAILED DESCRIPTION

Figure 1:
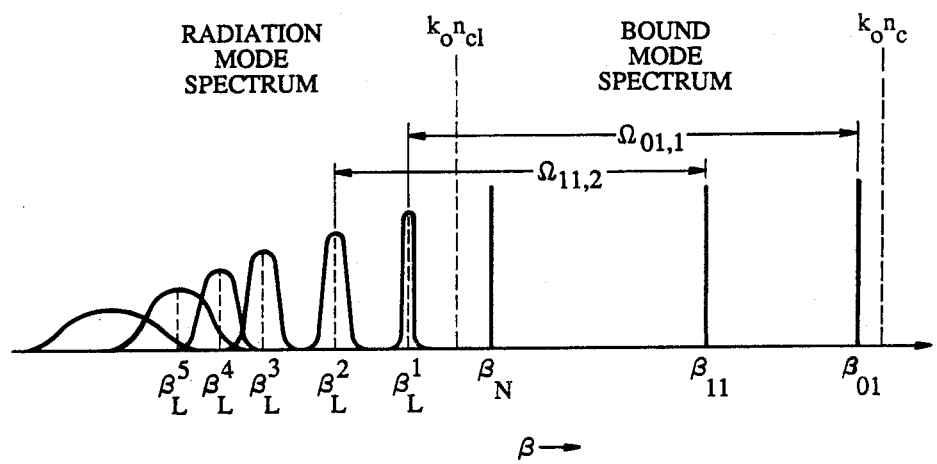
FIG. 1 shows the propagation constant spectrum of an exemplary fiber, and indicates possible grating-caused coupling between specific guided and TL modes.

FIG. 1 schematically depicts the spectrum of the propagation constant $\beta$ for an exemplary optical fiber in a hybrid system. As is well known, for wavelengths below the cut-off wavelength of an optical fiber, more than one bound mode of radiation can exist in the fiber. These modes have propagation constants $\beta_{01}, \beta_{11}, \ldots, \beta_N$, with $k_o n_{cl} < \beta_{ij} \leq k_o n_c$. In this expression $k_o 2\pi/\lambda_o$, $n_{cl}$ is the cladding refractive index, and $n_c$ is the core refractive index (the discussion herein is in terms applicable to a simple step index fiber; it is well known how to extend these concepts to more complicated fiber profiles). FIG. 1 shows the bound mode propagation constants $\beta_{11} \ldots \beta_N$ as sharp lines. In a formal sense they are analogous to the discrete energy levels of an atom. $\beta_N$ is the smallest propagation constant $< k_o n_{cl}$. In a lossless fiber all $\beta_{ij}$ are real.

For $\beta < k_o n_{cl}$, the corresponding modes are not bound to the fiber but are radiated away. Since these modes do not have to satisfy the Eigenvalue equation for propagating modes, the values of $\beta$ are not restricted to a discrete set of values. In a formal sense these modes are analogous to the continuum of unbound levels in an atom.

Although the spectrum of radiation modes is substantially a continuum, there exist certain groups of modes which can interfere with each other constructively. A mode within such a group acts, for relatively short propagation distances, similar to a bound mode. These are referred to as "tunneling leaky" (TL) modes or as "leaky" modes.

FIG. 1 also shows schematically the propagation constant spectrum for $\beta < k_o n_{cl}$, with $\beta_L^1, \beta_L^2, \ldots$ referring to the propagation constants of various TL modes. Since TL modes are radiation modes, their propagation constants are inherently complex. The values of $\beta_L^1$ indicated in FIG. 1 correspond to the real part of the respective propagation constants, whereas the width of the distributions are proportional to the imaginary part of the respective propagation constants. The low attenuation TL modes have relatively narrow distributions in $\beta$ (e.g., $\beta_L^1$), whereas the higher attenuation TL modes have relatively broader ones (e.g., $\beta_L^5$).

FIG. 1 also indicates the possibility of (quasi-resonant) coupling between various bound modes to TL modes. In order to get resonant coupling between any two bound modes $LP_{ij}$ and $LP_{kl}$, periodic variations must be introduced into the fiber at a spatial frequency $\Omega_{ij,kl} = 2\pi/\Delta_{ij,kl}$ (where $\Delta_{ij,kl}$ is the spatial period), such that $\Omega_{ij,kl} = \beta_{ij} - \beta_{kl}$. Similarly, a bound mode $LP_{ij}$ can be quasi-resonantly coupled to a (low-order) leaky mode with $\beta = \beta_L^k$ if the periodic variations have spatial frequency $\Omega_{ij,k} = \beta_{ij} - \beta_L^k$. For more detail, see the previously referred to U.S. Pat. No. 4,749,248.

After the energy of a bound mode is coupled to a TL mode its radiation from the cladding can be hastened by known means, e.g., by appropriate bending of the fiber, or by means of a further grating of differnt period.

Figure 2:
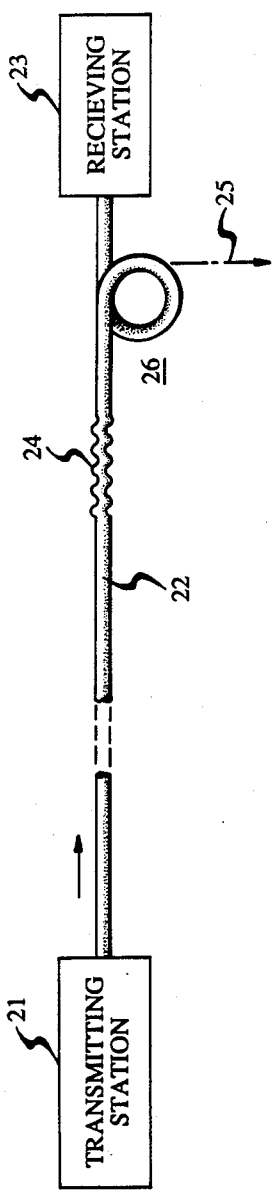
FIG. 2 schematically depicts an exemplary inventive system with one PMD.

FIG. 2 schematically depicts an exemplary hybrid communication system comprising a transmitting station 21, optical fiber 22, and a receiving station 23. The transmitting station comprises a source of radiation of wavelength $\lambda_o$. The radiation is coupled into the optical fiber by means that are not shown. The fiber has cut-off wavelength $\lambda_c > \lambda_o$, and therefore several modes of radiation propagate towards grating 24, which is caused to be present in the fiber (by means that are not shown) near the receiving station. The grating parameters are chosen such that at least one bound mode is efficiently coupled to a TL mode. The remaining bound modes (e.g., the $LP_{01}$ mode) propagate substantially undisturbed to 23 and are detected there, whereas the energy from the TL mode(s) is emitted (25) from the fiber. The presence of loop 26 aids in the emission.

Figure 3:
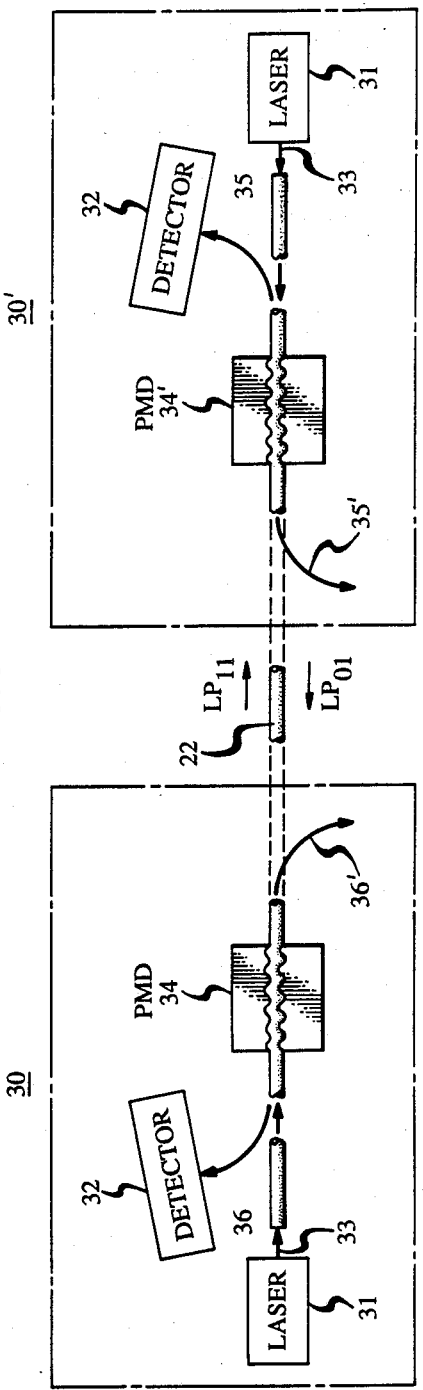
FIG. 3 schematically depicts a further exemplary inventive system that is adapted for simultaneous bidirectional signal transmission.

FIG. 3 schematically depicts a further exemplary hybrid communication system according to the invention, wherein optical fiber 22 connects two communication stations or terminals 30 and 30'. Each of the terminals comprises a laser 31 and a detector 32. Furthermore, 30 and 30' comprise periodic microbend device (PMD) 34 and 34', respectively. The PMDs advantageously comprise means for introducing periodic microbends in the fiber, e.g., two mating corrugated members (metal, plastic, or any other appropriate material) urged against the (typically coated) fiber by appropriate means. The laser wavelength $\lambda_o$ advantageously is chosen such that substantially only two bound modes ($LP_{01}$ and $LP_{11}$) can propagate in the fiber. The spatial wavelength of the corrugation of 34 is chosen such that $LP_{01}$ is coupled into an appropriate TL mode, and that of 34' is chosen such that $LP_{11}$ is coupled into a TL mode. In station 30, radiation 33 is coupled into the fiber, with the $LP_{01}$ portion (36') being emitted therefrom. The $LP_{11}$ mode portion propagates towards 30' (possibly reenergizing $LP_{01}$ to some extent), is tapped from the fiber by means of 34', and the emitted radiation 35 is detected. Signal transmission in the reverse direction proceeds analogously, except that 34' causes the emission of $LP_{11}$ radiation 35', and 34 taps $LP_{01}$ radiation 36 from the fiber. Extension to a system linking more than two stations is possible, as will be readily understood by those skilled in the art.

Prior art bidirectional communication systems (including hybrid systems that use the previously referred to fiber mode filter) are subject to problems due to power reflected from splices and other discontinuities in the transmission path. Reflected power not only can provide unwanted feedback to the radiation source but (in prior art systems) also impinges on the detection means, possibly causing registry of error bits. A significant advantage of an inventive bidirectional hybrid system is the significant reduction in the reflected power that reaches the detection means. This can easily be appreciated by reference to the exemplary system of FIG. 3.

At station 30 PMD 34 strips the $LP_{01}$ mode from the fiber, such that substantially only $LP_{11}$ power propagates towards 30'. If a splice or other discontinuity in the transmission path subsequent to 30 causes reflection of power, it is only $LP_{01}$ power that can reach detector 32. It is known that cross-coupling between modes during reflection is small. Thus, since the incident power is in the $LP_{11}$ mode, most of the reflected power is also in the $LP_{11}$ mode, and only a small portion is in $LP_{01}$. PMD 34 passes the $LP_{11}$ mode, and only the minor amount of $LP_{01}$ reflected power reaches detector 32 of 30. Similarly, only a minor amount of reflected $LP_{11}$ power reaches the detector of 30'.

As will be appreciated by those skilled in the art, the invention can be embodied in communication systems having a variety of architectures, and all such variants are contemplated. For instance, in an inventive system, both the radiation tapped from the fiber by means of a PMD and the undisturbed guided radiation can be detected. Furthermore, gratings need not have constant repeat spacing but can be quasi-periodic, and need not have constant amplitude but may having an envelope that varies as a function of the fiber axial coordinate z. As discussed in U.S. Pat. No. 4,749,248, quasi-periodicity and/or a non-constant envelope may be used to affect the coupling properties of a grating device.

Gratings (as defined herein) can be produced by a variety of means. In addition to forming a grating by impressing undulations upon the fiber axis, gratings can also be formed, for instance, by locally changing the refractive index of the fiber (e.g., of the core). Undulations are advantageously produced by means of a corrugated body (or two mating corrugated bodies) urged against the (typically coated) fiber. The refractive index of the fiber can be changed locally by means of e.g., the photo-elastic effect or the photo-refractive effect. In the former case, a force is exerted on preselected points of the fiber, e.g., by urging a corrugated body against the fiber. In the latter case, the fiber is caused to contain a photo-refractively active element (e.g., Ge), and the fiber is exposed to actinic radiation such that the refractive index of the fiber is changed in appropriate predetermined regions.

EXAMPLE I 820 nm pulsed laser radiation was coupled into one end of a 3 km length of a commercially available optical fiber ($\lambda_c = 1.27$ μm). A PMD (12 teeth, spacing about 430 μm) was applied to the coated fiber with an average load of about 0.2 lb/tooth. The transmitted signal was detected at the other fiber end by means of a conventional PIN photodetector. Application of the PMD resulted in essentially complete elimination of the $LP_{01}$ pulse from the fiber, with insignificant attenuation (about $-1$ db) of the $LP_{11}$ pulse. Without the PMD in place the (3 db) bandwidth of the system was about 90 MHz·km, with the PMD in place it was in excess of 1500 MHz·km.

EXAMPLE II

In an arrangement substantially as described in Example I, the PMD had 40 teeth, of spacing approximately 1200 μm, and the average load was about 0.1 lb/tooth. Application of the PMD produced essentially complete elimination of the $LP_{11}$ pulse from the fiber, with insignificant attenuation (about $-1$ db) of the $LP_{01}$ pulse. The system bandwidths were also substantially as in Example I.

What is claimed is:

1. An optical fiber communication system comprising
   (a) at least a first and a second communication station, the first station comprising a source of electromagnetic radiation of wavelength $\lambda_o$, the second station comprising means for detecting radiation of wavelength $\lambda_o$;
   (b) an optical fiber transmission channel linking the first and second stations such that at least some of the radiation of wavelength $\lambda_o$ is transmitted from the first to the second station, the fiber transmission channel comprising optical fiber having a cut-off wavelength $\lambda_c > \lambda_o$, such that more than one guided mode of the radiation of wavelength $\lambda_o$ is propagating from the first towards the second station; and
   (c) means for removing at least a substantial part of at least one of the guided modes of the radiation from the fiber transmission channel prior to the detection of the radiation of wavelength $\lambda_o$;
   characterized in that
   (d) the second station comprises a source of electromagnetic radiation substantially of wavelength $\lambda_o$ and the first station comprises first station detector means;
   (e) $\lambda_o$ is chosen such that guided modes comprises two modes, to be designated $LP_1$ and $LP_2$, wherein the means of (c) comprise first station means for resonantly coupling the $LP_1$ mode to a tunneling-leaky mode and second station means for resonantly coupling the $LP_2$ mode to a tunneling-leaky mode, wherein the first station detector means are adapted for receiving $LP_1$ mode radiation removed from the fiber after propagating from the second to the first station, and wherein the second station detector means are adapted for receiving $LP_2$ mode radiation removed from the fiber after propagating from the first to the second station; and wherein
   (f) each of the first and second station means for resonantly coupling a given mode to a tunneling-leaky mode comprise a fiber region in which the transmission characteristics of the fiber are varying substantially periodically or pseudo-periodically, this region to be referred to as a "grating", the parameters of a given grating selected such that the resonant coupling of (e) results.

2. The system of claim 1, comprising means for impressing an undulation upon the fiber axis or means for locally changing the refractive index of the optical fiber, such that the grating results.

3. The system of claim 2, wherein the means for impressing an undulation upon the fiber axis comprise at least one corrugated body, and means for urging the corrugated body against the fiber.

4. The system of claim 2, wherein the means for locally changing the refractive index of the fiber comprise a photo-refractively active chemical species present in the fiber, and means for exposing the fiber to actinic radiation adapted for changing the refractive index of the fiber in preselected regions by means of the photo-refractive effect.

5. The system of claim 2, wherein the means for locally changing the refractive index of the fiber comprise at least one corrugated body, and means for urging the corrugated body against the fiber, such that the refractive index in predetermined regions of the fiber is changed by means of the photo-elastic effect.

* * * * *